Patented Dec. 16, 1952

2,622,008

UNITED STATES PATENT OFFICE 2,622,008

PRODUCTION OF CARBON DIOXIDE

Warren W. Miller, State College, Pa., John Turkevich, Princeton, N. J., and Norman Zwiebel, Whitestone, N. Y., assignors to the United States of America as represented by the United States Atomic Energy Commission No Drawing. Application June 5, 1951, Serial No. 230,066

6 Claims. (Cl. 23—150)

This invention relates to the production of carbon dioxide and more particularly it is concerned with a method of releasing carbon dioxide from a thermally stable carbonate salt.

This application is a continuation-in-part of our co-pending application, Serial Number 72,546, filed January 24, 1949, now abandoned.

The radioactive carbon isotope, carbon-14, is an extremely valuable tracer element in organic chemical processes and in many biological processes, particularly because of its long half-life. In order to manufacture carbon-14, a thermally stable nitrogenous compound is irradiated with neutrons in a nuclear reactor. At least a portion of the nitrogen is converted to carbon-14 by the absorption of a neutron and emission of a proton. The resulting compound is oxidized to yield carbon dioxide which is removed from the compound and absorbed in a metal hydroxide such as barium hydroxide to yield the corresponding carbonate salt. It is then necessary to release the radioactive carbon dioxide from the carbonate salt. It is desired particularly to obtain the carbon dioxide in a pure dry state and also to release substantially all of the valuable carbon dioxide from the carbonate salt.

The usual method of accomplishing this has been to treat the barium carbonate in vacuo with a concentrated dehydrating acid, such as phosphoric or sulphuric acid. The principal difficulty with this method is that a crust of insoluble sulphate or phosphate salt forms around the particles of the carbonate salt and thus inhibits complete recovery of the carbon dioxide. Other acids may be used but they produce water in the reaction which is vaporized and mixes with the carbon dioxide gas. Even solid acidic salts, such as potassium bisulphate, are not useful for this purpose since they too produce water in the reaction. Inorganic acid anhydrides, such as $B_2O_3$, may be used in the molten state but they require so high a temperature that their use is not feasible. On the other hand, most organic anhydrides either sublime or distil under the high vacuum which is used in manufacturing the carbon dioxide from the carbonate salt. Calcination reactions are seldom feasible because of the high temperatures required to decompose such carbonates as barium carbonate. Furthermore, additants which react with air or decompose to produce acidic gases and thereby tend to reduce the calcination temperature cannot be used because there is no air present at the high vacuum employed and there is the ever-present problem of maintaining the carbon dioxide free of contaminants.

Accordingly, one of the objects of this invention is to provide an improved method of decomposing a thermally stable metal carbonate. Another of the objects of this invention is to provide a method of decomposing a relatively thermally stable metal carbonate at a relatively low temperature to obtain pure, dry carbon dioxide free from any solvent. A further object is to provide a method of preparing pure, dry carbon dioxide. A still further object is to provide a method of decomposing completely a thermally stable metal carbonate at a low temperature, the method to be carried out in the absence of air, moisture and solvent. Still other objects will become apparent in the following description.

In accordance with the present invention, the carbon dioxide is obtained from the thermally stable carbonate salt in a dry and pure state by heating the carbonate in a high vacuum in the absence of any added solvent with an anhydrous salt of a metal which forms a relatively thermally unstable carbonate. The anhydrous salt must also be thermally stable and its anion non-acidic. The term "non-acidic" is used herein to mean only that the anion is incapable of donating a proton. The term "high vacuum" is used in its usual sense to designate an absolute pressure of less than 0.01 mm. of mercury, i. e. the substantial absence of any gases or vapors.

In a typical reaction in accordance with this invention lead chloride (melting point 501° C.) is reacted with barium carbonate at an elevated temperature at a pressure preferably of about $10^{-5}$ mm. The temperature at which the reaction is carried out will depend primarily upon the nature of this metal salt. For example, with lead chloride a measurable quantity of carbon dioxide is released at a temperature of about 180° C. It is preferred, however, to employ temperatures within 100° C. of the melting point of the metal salt so that the evolution of the carbon dioxide from the carbonate salt is at a practical rate. It is desirable also to employ a large excess of the metal salt in order to shorten the time required for substantially complete reaction. This excess may be of the order of 250 to 500% of the molar quantity required in the reaction. The pressure is not particularly critical so long as a high vacuum is maintained. However, it is most desirable to use as low a pressure as possible, for example $10^{-5}$ mm.

The following examples are presented to illustrate the method of the present invention with the understanding that the invention should not be construed as being limited by the details contained therein.

*Example 1*

An intimate mixture was prepared containing 53 grams of pure, dry, powdered anhydrous lead chloride and 9.67 grams of pure, dry, powdered barium carbonate. The mixture was placed in a sealed container and the container evacuated overnight to a pressure of the order of $10^{-5}$ millimeters of mercury absolute. The mixture was then heated in the evacuated container and the rate of increase in the pressure observed as a measure of the rate of reaction, the container having a volume of about 1610 cubic centimeters. Between 240 and 250° C. the pressure increased at the rate of about 1 millimeter of mercury per minute. After a relatively short time this temperature was raised to 300° C. and the rate of increase in pressure again measured. For 10 minutes at this temperature the rate of increase was approximately 5 millimeters per minute and after 20 minutes the rate had fallen to 3 millimeters per minute. The heating was continued and after 40 minutes the rate had fallen to approximately 2.2 millimeters per minute while after 3 hours the rate of increase of pressure had fallen to 0.5 millimeter per minute.

After 3 hours the temperature was raised to 335° C. and at this temperature the rate of increase of pressure was approximately 1 millimeter per minute. The rate fell to about 0.7 after 25 minutes. On increasing the temperature to 367° C. the rate was increased to 1.3 millimeters per minute where it remained for about 10 minutes. After 15 minutes at 367° C., however, the rate fell to about 1 millimeter per minute.

*Example 2*

When the dry barium carbonate and lead chloride in about the same proportions as Example 1 were heated together under the same high-vacuum conditions at a temperature of about 400° C., the evolution of carbon dioxide was about 65% complete within 1 hour, the temperature having been raised to 400° C. in less than 30 minutes. After 2 hours about 80% of the carbon dioxide had been evolved and after 4 hours the reaction was 96% complete.

In carrying out this reaction the metal salt may be fused if desired and when this is done the reaction proceeds at a greater rate both as a result of the increased temperature and of the greater mobility of the fused salt which we believe reacts directly with the stable carbonate. It may often be desirable to employ a particular fused salt at a temperature below the melting point of the salt. In such an instance a molten mixture of salts may be used such as silver chloride with lead chloride. The lowest temperature is obtained by employing the eutectic mixture. Thus when the silver chloride-lead chloride eutectic is employed the reaction proceeds at least to 98% of completion in less than an hour at 310° C., the melting point of the mixture.

Salts other than lead chloride may also be used. For example, silver chloride may be used alone as may lead iodide or other metal halide salts, such as beryllium chloride, cadmium iodide, copper bromide, etc. which are readily obtained in the anhydrous state. Similarly, anhydrous metal salts of other anions may be employed provided that the anion is non-acidic and thermally stable and that the metal forms a relatively unstable carbonate when compared to the original carbonate, which it is desired to decompose. As indicated, the temperatures of such reactions may be below the fusion point of such metal salt but are preferably carried out at a temperature within 100° of the fusion point.

It will be seen from the foregoing description that the method of the present invention includes the degradation of a relatively thermally stable carbonate salt by a metathetical reaction to a relatively thermally unstable carbonate salt. This is accomplished simply by heating together in the absence of any other substance the relatively stable metal carbonate salt and an anhydrous salt of a metal and a stable non-acidic inorganic anion, the metal forming a relatively thermally unstable carbonate in the reaction. No added solvent is required in this reaction and indeed the addition of a solvent is objectionable since the solvent will be volatilized on heating and its vapor be carried with the carbon dioxide evolved. The present method is particularly advantageous in that it may be carried out at temperatures well below the fusion point of glass and thus glass apparatus may be employed. Further, substantially complete reaction is obtained in a relatively short time at a low temperature whereas the calcination of barium carbonate for example would proceed extremely slowly at such low temperatures. The same is true of other thermally stable carbonate salts, such as the carbonates of calcium and strontium. Magnesium and beryllium carbonates are of course quite unstable toward heat. It is necessary that the carbonate salt contain neither chemically nor physically bound water which may be liberated upon heating.

It is notable that the initial reaction, in contrast to a calcination, is a metathesis between a thermally stable carbonate salt and a thermally stable metal salt of a non-acidic inorganic anion. That is to say that during the course of the reaction neither of the original reactants is decomposed into its constituents. Furthermore, since all substances other than the reactants are excluded by the high vacuum and the requirement that no solvent be used, there is no opportunity for either of the reactants to enter into any reaction but the desired metathesis. For example, in the presence of air or moisture many metal halide salts are decomposed at elevated temperatures to yield either the halide or the hydrogen halide. While these acidic gases may assist in the decomposition of the thermally stable carbonate, the additional problem arises of their separation from the product carbon dioxide. The present invention contemplates a new reaction wherein two dry anhydrous salts react directly with each other in a high vacuum to produce by metathesis a thermally stable product and a thermally unstable product, and the latter is decomposed by calcination. For example, the reactions involving barium carbonate and lead chloride may be represented as follows:

1. $BaCO_3 + PbCl_2 \rightarrow PbCO_3 + BaCl_2$

2. $PbCO_3 \xrightarrow{\Delta} PbO + CO_2$

Since many embodiments might be made of the present invention and since many changes might be made in the embodiment described, it is to be understood that the foregoing description is to be interpreted as illustrative only and not in a limiting sense.

We claim:

1. In the method of preparing radioactive carbon wherein the carbon is incorporated as carbon dioxide in a carbonate salt of an alkaline earth metal selected from the group consisting of strontium, calcium and barium, the method of liberating the carbon dioxide comprising mixing said carbonate salt in the dry with at least one dry, anhydrous halide salt selected from the group consisting of silver chloride, lead chloride, beryllium chloride, cadmium iodide and copper bromide, heating the mixture at a pressure of less than $10^{-2}$ millimeters of mercury absolute in the absence of any added solvent at a temperature sufficient to liberate carbon dioxide and separating carbon dioxide as a pure, dry gas.

2. The method of claim 1 in which the carbonate salt is barium carbonate.

3. In the method of preparing radioactive carbon in which the carbon is incorporated as carbon dioxide in a carbonate salt of an alkaline earth metal selected from the group consisting of strontium, calcium and barium, the method of liberating carbon dioxide that comprises mixing said carbonate salt in the dry with dry, anhydrous lead chloride and heating the mixture at a pressure of less than $10^{-2}$ millimeters of mercury absolute at a temperature sufficient to liberate carbon dioxide and separating the carbon dioxide as a pure, dry gas.

4. The method of claim 3 in which the mixture is heated at a temperature in the range of 400 to 500° C.

5. In the method of preparing radioactive carbon wherein the carbon is incorporated as carbon dioxide in barium carbonate, the method of liberating the carbon dioxide comprising mixing the barium carbonate in the dry with a dry, anhydrous, eutectic composition of anhydrous lead and silver chlorides and heating the mixture at a pressure of less than $10^{-2}$ millimeters of mercury absolute in the absence of any added solvent at a temperature sufficient to melt said eutectic composition and thereby to liberate the carbon dioxide, and separating the carbon dioxide as a pure, dry gas.

6. In the method of preparing radioactive carbon in which the carbon is incorporated as carbon dioxide in barium carbonate, the method of liberating the carbon dioxide comprising the steps of mixing said barium carbonate in the dry with dry, anhydrous lead chloride, the quantity of lead chloride being from 250 to 500% of the number of moles of said carbonate salt, heating the mixture at a pressure of less than $10^{-2}$ millimeters of mercury absolute at a temperature within 100° C. of the melting point of the lead chloride at a temperature sufficient to liberate carbon dioxide and recovering the carbon dioxide as a pure, dry gas.

WARREN W. MILLER.
JOHN TURKEVICH.
NORMAN ZWIEBEL.

REFERENCES CITED

The following references are of record in the file of this patent:

UNITED STATES PATENTS

| Number | Name | Date |
|---|---|---|
| 1,565,215 | Smith | Dec. 8, 1925 |
| 1,661,043 | Koehler | Feb. 28, 1928 |

OTHER REFERENCES

J. W. Mellor's "A Comprehensive Treatise on Inorganic and Theoretical Chemistry," vol. 4, page 507; vol. 7, pages 830, 833, Longmans, Green and Co., N. Y.